(12) United States Patent
Takenoiri et al.

(10) Patent No.: US 6,706,318 B2
(45) Date of Patent: Mar. 16, 2004

(54) METHOD OF MANUFACTURING A PERPENDICULAR MAGNETIC RECORDING MEDIUM

(75) Inventors: Shunji Takenoiri, Nagano (JP); Yasushi Sakai, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 24 days.

(21) Appl. No.: 10/189,197

(22) Filed: Jul. 5, 2002

(65) Prior Publication Data

US 2003/0044565 A1 Mar. 6, 2003

(30) Foreign Application Priority Data

Jul. 5, 2001 (JP) ......................................... 2001-205178

(51) Int. Cl.$^7$ ................................................. B05D 5/12
(52) U.S. Cl. .................... 427/130; 427/131; 427/132; 427/374.1; 427/383.1; 427/398.1; 427/398.2; 427/398.3; 427/404
(58) Field of Search ............................... 427/130, 131, 427/132, 374.1, 383.1, 398.1, 398.2, 398.3, 404

Primary Examiner—Bernard Pianalto

(57) ABSTRACT

A perpendicular magnetic recording media and method of manufacturing therefore includes a nonmagnetic substrate, an underlayer deposited on the nonmagnetic substrate, and a magnetic recording layer formed on the underlayer, quickly heated, and quenched. A protective layer is deposited on the magnetic recording layer, and a liquid lubricant layer is deposited on the protective layer, to improve an uniaxial anisotropy Ku and a coercive force Hc of the magnetic recording layer.

11 Claims, 1 Drawing Sheet

METHOD OF MANUFACTURING A PERPENDICULAR MAGNETIC RECORDING MEDIUM

CROSS-REFERENCE TO RELATED APPLICATIONS

This application claims the benefit of Japanese Application No. 2001-205178, filed Jul. 5, 2001, in the Japanese Patent Office, the disclosure of which is incorporated herein by reference.

BACKGROUND OF THE INVENTION

1. Field of the Invention

The present invention relates to a perpendicular magnetic recording medium mounted on various magnetic recording apparatuses and a manufacturing method therefor.

2. Description of the Related Art

As a technology for increasing a density of magnetic recording, perpendicular magnetic recording media has attracted attention as a potential alternative to a conventional longitudinal recording method.

A perpendicular magnetic recording medium includes a magnetic recording layer of a hard magnetic material, an underlayer that directs the magnetic recording layer in a desired direction, a protective layer that protects a surface of the magnetic recording layer, and a lining layer of a soft magnetic material that causes a concentration of a magnetic flux generated by a magnetic head used to record on the magnetic recording layer.

In recent years, as a recording density of magnetic recording media based on the longitudinal recording method increases, a loss of recorded data associated with thermal instability (i.e., thermal fluctuations) increases. Conversely, it has been assumed that the thermal stability problem is less pronounced with perpendicular recording media than with a longitudinal recording method, because a stability of bits (recorded data) increases linearly with density. However, it is expected that a film thickness of the magnetic recording layer will be further reduced, rendering the current level of achieved thermal stability insufficient. There have also been demands to increase the stability of low-density recording for servo patterns or similar applications. Thus, even for perpendicular recording media, improving thermal stability is an important goal.

Because the thermal stability of the perpendicular recording medium is proportional to an uniaxial anisotropy constant (hereinafter referred to as "Ku"), Ku can be increased to improve thermal stability. Specific examples of recent approaches to increasing Ku include a Co/Pt multilayer stacked film, a Co/Pd multilayer stacked film, a CoPt ordered alloy, a FePt ordered alloy, and use of an amorphous material, such as TbFeCo. However, manufacturing processes for multilayer stacked films are not suitable for mass production, the ordered alloys require an annealing process to ensure correct ordering, and a corrosion resistance of the amorphous material must be improved. Accordingly, all of these proposed methods pose problems that need to be solved prior to a practical use.

SUMMARY OF THE INVENTION

As previously described, Co/Pt and Co/Pd multilayer stacked films, Copt and FePt ordered alloys and similar materials, and amorphous materials such as TbFeCo, all have a high Ku, are disadvantageous for mass-producing recording media. If the recording media are to be mass-produced, a conventional CoCr-based magnetic recording material should be used to increase Ku, thereby improving thermal stability. However, the increase in Ku achieved by changing a composition of the recording material is limited. Thus, measures other than changing the composition of the recording material have been sought.

The following methods are proposed to solve the above problems: (1) An underlayer including a metal or an alloy having a hexagonal closest-packing (hereafter referred to as "hcp") type of crystal structure such as Ru, Ti, TiCr, Re, CoCr, CuZn, IrMo, $Ir_2W$, MoPt, or $MoRh_2$, which has a larger a-axis lattice constant than the recoding material used for a magnetic recording layer. A resulting magnetic recording layer including the above set forth underlayer has an increased a-axis lattice constant for a relative reduction in a c-axis lattice constant, thereby increasing magnetostriction and Ku. However, if the lattice constant differs excessively, a crystal structure (lattice constant) of the magnetic recording layer does not follow the underlayer. A ceiling for this difference is about 20%. (2) The underlayer including a metal or an alloy having a face-centered cubic lattice (hereafter referred to as "fcc") type of crystal structure such as Pd, Cu, Au, Ir, Pt, Rh, Ag, $Ni_3Al$, or $Co_3Ti$, which has an (a-axis lattice constant)×$1/\sqrt{2}$ larger than an a-axis lattice constant of the material used for the magnetic recording layer. Thus, the magnetic recording layer has an increased a-axis lattice constant for a relative reduction in the c-axis lattice constant, thereby increasing magnetostriction and Ku. As in (1), the upper limit of the difference between the lattice constant of the magnetic recording layer and the (a-axis lattice constant of the underlayer)×$1/\sqrt{2}$ is about 20%. (3) The underlayer of (1) or (2) is used and quenched immediately after a formation of the magnetic recording layer to distort the film to cause magnetostriction, thereby increasing Ku and a coercive force Hc. (4) The underlayer pf (1) or (2) is used and quickly heated immediately after the formation of the magnetic recording layer and before quenching to produce effects similar to those in (3).

As described above, according to an embodiment of the present invention, the thermal stability of the magnetic recording layer is improved to make the recording medium more reliable. Further, the present invention can be used with the conventional CoCr-based magnetic recording material to form film using conventional apparatuses. Therefore, the present invention is suitable for mass production.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objective and advantage of the present invention will become more apparent by describing in detail preferred embodiments thereof with reference to the attached drawings in which.

DETAILED DESCRIPTION OF THE PREFERRED EMBODIMENTS

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 1:
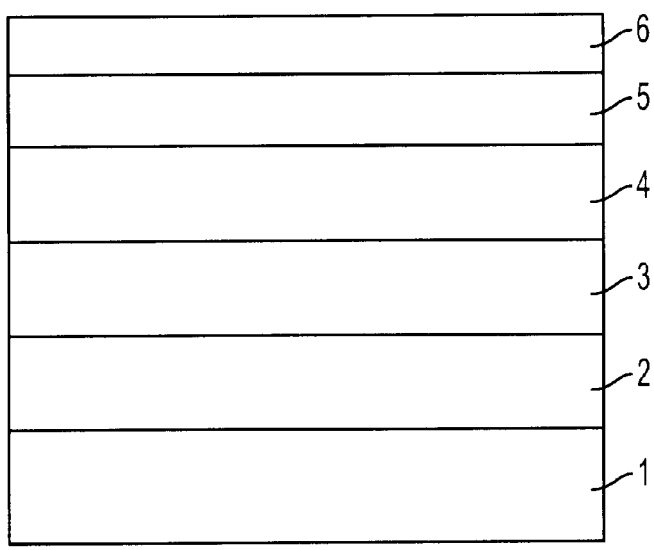
FIG. 1 is a schematic sectional view of a perpendicular two-layer medium according to an embodiment of the present invention.

FIG. 1 is a schematic sectional view of a perpendicular magnetic recording medium (i.e., a perpendicular two-layer medium including a magnetic recording layer and a soft magnetic lining layer) according to an embodiment of the present invention. The perpendicular magnetic recording medium includes an underlayer 3, a magnetic recording layer 4, and a protective layer 5, sequentially formed on a nonmagnetic substrate 1, with a liquid lubricant layer 6 formed on top of these layers. A soft magnetic lining layer 2 is provided between the nonmagnetic substrate 1 and the underlayer 3 to prevent a spread of a magnetic flux generated by a head during recording, to provide magnetic fields in a vertical direction. Accordingly, the soft magnetic lining layer 2 would ideally be present, but recording may be achieved without this layer.

The nonmagnetic substrate 1 includes Al alloy plated with NiP, reinforced glass, or crystallized glass, which is used for normal magnetic recording media. A surface of nonmagnetic substrate 1 may be treated as required to attain a desired roughness or shape.

Next, the soft magnetic lining layer 2 may be provided on the surface of non-magnetic substance 1. As previously described, the soft magnetic lining layer 2 is effective in concentrating the magnetic flux from the head to provide vertical magnetic fields, but may be omitted. Material for the soft magnetic lining layer 2 may include a crystal NiFe alloy, Sendust (FeSiAl) alloy, or amorphous Co alloy. The amorphous Co alloy may be CoZrNb or a similar material. The optimum value of the film thickness of soft magnetic lining layer 2 varies depending on a structure or characteristics of the magnetic head used for recording. Productivity considerations make an ideal optimum value from about 10 nm to about 500 nm or less.

The soft magnetic lining layer 2 can be formed using arbitrary methods from associated technologies, including vapor deposition, sputtering, electron beam vapor deposition, or CVD. A sputtering process is preferred, and a DC magnetron sputtering process is recommended. The soft magnetic lining layer 2 may be formed while heating the substrate 1 or applying bias voltage to the substrate 1. A temperature at which the substrate 1 is heated depends on the desired characteristics. In general, the temperature may be between 150° C. and 350° C.

Next, the underlayer 3 is provided on a surface of the nonmagnetic substrate 1 or the soft magnetic lining layer 2. According to an embodiment of the present invention, the underlayer 3 is used to distort a crystal structure of the magnetic recording layer 4 formed on the underlayer 3 to increase a uniaxial anisotropy Ku and a coercive force Hc of the magnetic recording layer 4. For instance, the underlayer 3 may have a film thickness between 5 nm and 30 nm. In an embodiment of the present invention, distortion is applied so that an hcp structure of the magnetic recording layer expands along an a-axis. The underlayer 3 may include various metals or alloys having the hcp structure or an fcc structure of an appropriate a-axis lattice constant.

Ru, which has an a-axis lattice constant amounting to 110% of the a-axis lattice constant of the magnetic recording layer 4, has a good hcp structure for the underlayer 3. Other materials having good hcp structures for the underlayer 3 include metals or alloys having the a-axis lattice constants greater than 100% and less than or equal to 120% of the a-axis lattice constant of the material for the magnetic recording layer such as Ti, TiCr, Re, CoCr, CuCr, CuZn, IrMo, $Ir_2W$, MoPt, and $MoRh_2$. For instance, the underlayer material having the hcp structure may have the a-axis lattice constant larger than 105% and less than or equal to 110% of the a-axis lattice constant of the magnetic recording layer material. The a-axis lattice constant falling within the previously described range allows the crystal structure of the magnetic recording layer 4 to follow the crystal structure of the underlayer 3, and enables an efficient application of distortion.

Materials having the fcc structure ideal for the underlayer 3 include Pd, Cu, Au, Ir, Pt, Rh, Ag, $Ni_3Al$, and $Co_3Ti$. All these materials have an (a-axis lattice constant)×$1/\sqrt{2}$ greater than 100% and less than or equal to 120% of the a-axis lattice constant of the magnetic recording layer 4. Specifically, the underlayer 3 having the fcc structure has an a-axis lattice constant×$1/\sqrt{2}$ larger than 105% and less than or equal to 110% of the a-axis lattice constant of the magnetic recording layer material. The a-axis lattice constant falling within the previously described range allows the crystal structure of the magnetic recording layer to follow the crystal structure of the underlayer 3, and enables the efficient application of distortion.

The underlayer 3 can be formed using arbitrary processes from associated technologies, including vapor deposition, sputtering, electron beam vapor deposition, or CVD. The sputtering process is preferred, and the DC magnetron sputtering process is recommended. The underlayer 3 may be formed while heating the substrate 1 or applying bias voltage to the substrate 1. The temperature at which the substrate 1 is heated depends on the desired characteristics. In general, the ideal temperature is between 150° C. and 350° C.

The a-axis lattice constant herein is measured in a bulk (without distortion) state unless otherwise specified. For notably complicated alloys, the a-axis lattice constant can be determined by separately forming a film of the target alloy on a glass substrate, then analyzing the film formed by an X-ray diffraction. The following shows the a-axis lattice constants of typical materials that can be used as the magnetic recording layer 4 and the underlayer 3 according to an embodiment of the present invention. (Ni15Fe25Cr indicates an alloy including 15 atom % of Fe, 25 atom % of Cr, and a remaining amount of Ni on a basis of a number of all atoms.)

TABLE 1

| Crystal structure | a-axis lattice constant (Å) | a-axis lattice constant x ($1/\sqrt{2}$) (Å) | Ratio of each lattice constant to CoCrPt lattice constant* (%) |
| --- | --- | --- | --- |
| CoCrPt | hcp | 2.53 | — | 100 |
| Ru | hcp | 2.71 | — | 107 |
| Pd | fcc | 3.89 | 2.75 | 109 |
| TiCr | hcp | 2.95 | — | 117 |
| Ni15Fe25Cr | fcc | 3.59 | 2.54 | 100.3 |

*a-axis lattice constant for hcp and a-axis lattice constant x ($1/\sqrt{2}$) for fcc Next, the magnetic recording layer 4 is provided on a surface of the underlayer 3. The magnetic recording layer 4 includes a ferromagnetic material of an alloy containing at least Co and Cr. The preferred alloy includes CoCr, CoCrPt, or CoCrTa having the hcp structure. If the magnetic recording layer 4 is used for the perpendicular magnetic recording medium, the c axis (i.e., the easy axis of magnetization) of the hcp structure of these alloys must be oriented perpendicular to a surface of the magnetic recording layer 4.

Magnetic recording layer 4 can be formed using arbitrary processes from associated technologies, including vapor deposition, sputtering, electron beam vapor deposition, or CVD. The sputtering process is preferred, and the DC magnetron sputtering process is recommended. Magnetic recording layer 4 may be formed while heating the substrate 3 or applying bias voltage to the substrate 3. The temperature at which the substrate 3 is heated depends on the desired characteristics. For instance, the temperature may be between 150° C. and 350° C.

In an embodiment of the present invention, the magnetic recording layer 4 may be distorted to increase its magnetic anisotropy and coercive force when quenched immediately after formation. The term "quenching" as used herein means that the temperature of the magnetic recording layer 4 is reduced by 100° C. to 300° C. at a rate of 10° C. to 30° C./min. Ideally, the quenching operation reduces the temperature of the magnetic recording layer by 150° C. to 200° C. at a rate of 20° C. to 25° C./min.

Such quenching operation can be performed by introducing a coolant as an inert gas into a film formation chamber, or by using the coolant to cool a holder holding the magnetic recording medium on which films are being formed. Alternatively, the magnetic recording medium on which films are formed may be moved to a cooling chamber located next to the film formation chamber, where the above operation may be performed. Ideally, the quenching operation is performed in the cooling chamber.

Alternatively, in an embodiment of the present invention, magnetic recording layer 4 may be quickly heated immediately after formation and before quenching. This method is particularly effective in forming magnetic recording layer 4 at relatively low temperatures (between room temperature and 250° C.). The term "quick heating" as used herein means that the temperature of the magnetic recording layer 4 is increased by 100° C. to 400° C. at a rate of 10° C. to 35° C./min. Ideally, the quick heating operation increases the temperature of the magnetic recording layer by 100° C. to 200° C. at a rate of 10° C. to 20° C./min. Such quick heating operation can be performed using arbitrary methods from associated technologies, including a lamp heater, a sheath heater, use of a heat medium to heat the holder holding the magnetic recording medium on which films are being formed, or inductive heating.

After magnetic recording layer 4 has been quenched or quickly heated, the protective layer 5 is formed on the surface of the magnetic recording layer 4. The protective layer 5 may be formed of a material conventionally used for protective layers, such as a material including mainly carbon. The film thickness and other conditions for the protective layer 5 may be the same as those used for normal magnetic recording media.

The protective layer 5 can be formed using arbitrary processes from associated technologies, including vapor deposition, sputtering, electron beam vapor deposition, or CVD. The sputtering process is preferred, and the DC magnetron sputtering process is recommended. The protective layer 5 may be formed while heating the substrate 3 or applying bias voltage to the substrate 3. The temperature at which the substrate 3 is heated depends on the desired characteristics. In general, the temperature may be between 250° C. and 300° C.

Finally, the liquid lubricant layer 6 is formed on a surface of protective layer 5. The liquid lubricant layer 6 includes such a conventional material as a perfluoropolyether-based lubricant. The film thickness and other conditions for the liquid lubricant layer 6 may be the same as those used for normal magnetic recording media. The liquid lubricant layer 6 can be formed using arbitrary methods from associated technologies, including a dip coat process, a spin coat process, or a roll coating process. The dip coat process is preferred.

Further, in an embodiment of the present invention, any stacked layers starting with the underlayer 3 or the soft magnetic lining layer 2, if any, and ending with the protective layer 5 can be formed within the same apparatus. In particular, if a reduced pressure condition is used to form each layer, the formation process may be executed so as to avoid deviation from this condition within the same apparatus. Further, the perpendicular magnetic recording media may be manufactured sequentially carrying out, according to a following order, the depositing of the underlayer 3, the forming of the magnetic recording layer 4, the quenching of the magnetic recording layer 4, the depositing of the protective layer 5, and the depositing of the liquid lubricant layer 6.

The following are exemplary embodiments of the present invention.

EXAMPLE 1

A nonmagnetic substrate includes a chemically reinforced glass substrate with a smooth surface (e.g., N-10 glass substrate manufactured by HOYA CORPORATION). The substrate is washed, and then introduced into a sputtering apparatus, where an Ru target is used to form an Ru underlayer of 5 nm in thickness. Subsequently, a lamp heater is used to heat the substrate until the surface of the substrate measures 300° C. A Co20Cr10Pt target is then used to form a CoCrPt magnetic recording layer of 20 nm in thickness. Then, the substrate on which films are formed is introduced into the cooling chamber, where the substrate is quenched so that its temperature decreases from 300° C. to 150° C. in seven seconds, for instance. The substrate, on which films were being formed, are again transferred to the film formation chamber. Finally, a carbon target is used to form a protective film including carbon and having a thickness of 10 nm, and the substrate is removed from the vacuum apparatus. Other than heating by the heater and quenching, these film formation steps are carried out under an Ar gas pressure of 5 mTorr (0.67 Pa) using a DC magnetron sputtering process. Subsequently, a liquid lubricant layer including perfluoropolyether and having a thickness of 2 nm is formed using a dip coat process to form a single-layer perpendicular magnetic recording medium.

For the completed perpendicular recording medium, a coercive force Hc is evaluated using a VSM (vibrating sample magnetometer), Ku is evaluated using a torque magnetometer, and the c-axis lattice constant of the magnetic recording layer is evaluated using an X-ray diffraction apparatus. Further, the structure is observed using TEM. Table 2 lists characteristics of the vertical recording medium of this example by comparing a case where the underlayer includes Ni15Fe25Cr, which is an alloy having an (a-axis lattice constant)×1/√2 substantially equal to the a-axis lattice constant of the magnetic recording layer, and having an fcc type of crystal structure (Comparative Example 1), when Ru is used as the underlayer and no quenching operation is performed (Comparative Example 2).

TABLE 2

|  | Example 1 | Comparative Example 1 | Comparative Example 2 |
| --- | --- | --- | --- |
| Underlayer | Ru Quenching | Ni15Fe25Cr No quenching | Ru No quenching |
| Coercive force Hc (kA/m) | 316.7 | 202.0 | 288.3 |
| Ku ($10^{-1}$ MJ/m$^3$) | 2.2 | 1.7 | 1.9 |
| c-axis lattice constant (Å) | 4.122 | 4.143 | 4.130 |

The table indicates that both the Hc and Ku are increased, and the c-axis lattice constant of the magnetic recording layer is reduced by changing the Ni15Fe25Cr underlayer, the crystal lattice which substantially matches that of the magnetic recording layer, to the Ru underlayer having an a-axis lattice constant greater than that of the Ni15Fe25Cr underlayer. Further, even with the same Ru underlayer, both the Hc and Ku are increased by 10% or more and the c-axis lattice constant of the magnetic recording layer is reduced by quenching the magnetic recording layer after formation. Because no normal X-ray diffraction apparatuses can measure the a-axis lattice constant of the magnetic recording layer, stacked in the magnetic recording medium, the a axis can only be assumed to be elongated relative to a contraction of the c axis (at such a rate that the volume remains constant), thereby increasing magnetostriction. Because TEM observations indicate that there are no major differences between the microstructures of these samples, it can be assumed that the changes in the Hc and Ku are caused by magnetostriction resulting from distortion of the crystal lattice of the magnetic recording layer. Thus, the Ku and Hc could be increased by changing the underlayer without changing a composition of the magnetic recording layer and quenching the magnetic recording layer immediately after formation. Because the thermal stability of the magnetic recording media with magnetic recording layers having equivalent microstructures is proportional to the Ku of the magnetic recording media, this embodiment serves to improve the thermal stability of the magnetic recording medium.

EXAMPLE 2

A perpendicular medium is produced in a same manner as in Example 1 except that a Pd target is used as the underlayer instead of the Ru to form a Pd film of 5 nm in thickness, and that a Co17Cr17Pt target is used to form a CoCrPt magnetic recording layer of 20 nm in thickness. Table 3 lists the Hc, the Ku, and the c-axis lattice constants obtained when the quenching operation is performed and when the quenching operation is not performed (Comparative Example 3).

TABLE 3

|  | Example 2 Quenching | Comparative Example 3 No quenching |
|---|---|---|
| Coercive force Hc (kA/m) | 388.3 | 324.8 |
| Ku ($10^{-1}$ MJ/m$^3$) | 3.2 | 2.7 |
| c-axis lattice constant (A) | 4.120 | 4.162 |

The above described characteristics are measured using a VSM, a torque magnetometer, and the X ray diffraction apparatus, as in Example 1. The table indicates that the c-axis lattice constant of the magnetic recording layer decreases while the Hc and Ku increase, as in Example 1. These results indicate that this example also improves the thermal stability of the medium.

EXAMPLES 3 AND 4

The nonmagnetic substrate includes a chemically reinforced glass substrate with a smooth surface (e.g., N-10 glass substrate manufactured by HOYA CORPORATION). The substrate is washed, then introduced into a sputtering apparatus, where a Co5Zr8Nb target is used to form a CoZrNb soft magnetic lining layer of 200 nm in thickness. Then, an Ru target is used to form an Ru underlayer of 5 nm in thickness. Subsequently, the lamp heater is used to heat the substrate until the surface of the substrate measures 220° C. A Co20Cr10Pt target is then used to form a CoCrPt magnetic recording layer of 20 nm in thickness. Subsequently, the lamp heater is used to heat the substrate until the surface of the substrate measured 320° C. Then, the substrate on which films are formed is introduced into the cooling chamber, where the substrate is quenched, reducing the temperature from 320° C. to 150° C. in seven seconds. The substrate on which films are formed is transferred to the film formation chamber once again. Finally, a carbon target is used to form a protective film including carbon and having a thickness of 10 nm, and the substrate is then removed from the vacuum apparatus. These film formation steps other than heating by the heater and quenching, are carried out under an Ar gas pressure of 5 mTorr (0.67 Pa) using the DC magnetron sputtering process. Subsequently, a liquid lubricant layer including perfluoropolyether and having a thickness of 2 nm is formed using the dip coat process to form a perpendicular magnetic recording medium.

Figure 2:
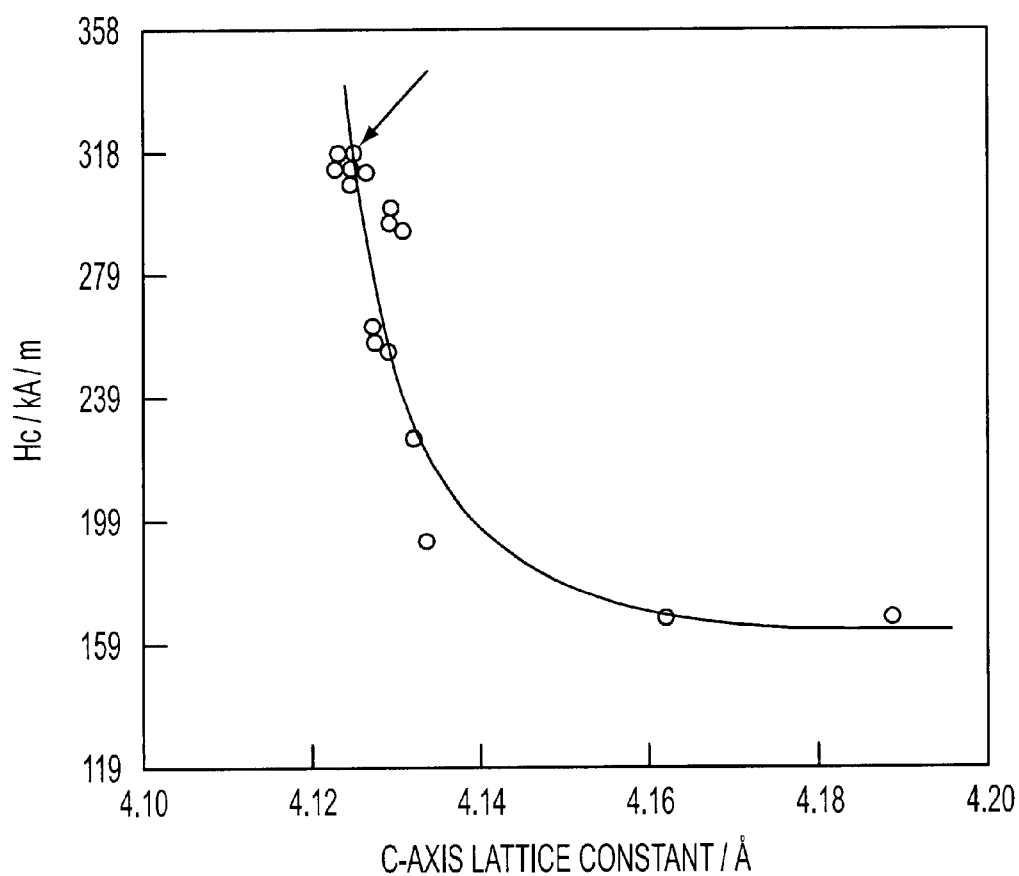
FIG. 2 is a graph showing a relationship between a c-axis lattice constant and a coercive force Hc of a magnetic recording layer, according to an embodiment of the present invention.

Various magnetic recording media are produced using the same method described above, except for the heating temperature used before the formation of the magnetic recording layer, execution or omission of quick heating after film formation, and execution or omission of quenching. For these magnetic recording media, coercive force Hc is measured using the Kerr effect (i.e., measuring the rotation angle of the plane of polarization of incident light while simultaneously applying external magnetic fields), and the c-axis lattice constant of the magnetic recording layer is measured using the X-ray diffraction apparatus. FIG. 2 shows a relationship between the c-axis lattice constant and the coercive force Hc of the magnetic recording layer. The points shown by an arrow in FIG. 2 indicate the characteristics of the magnetic recording medium of Example 3, produced in the above described manner. Table 4 lists the characteristics of the typical magnetic recording medium.

TABLE 4

|  | Example 3 | Example 4 | Comparative Example 4 |
|---|---|---|---|
| Quick heating | 320° C. | Omitted | Omitted |
| Quenching | 150° C. | 150° C. | Omitted |
| Hc (kA/m) | 318.6 | 261.8 | 256.5 |
| c-axis lattice constant (Å) | 4.123 | 4.126 | 4.127 |

As shown in FIG. 2, coercive force Hc tends to increase with decreases in the c-axis lattice constant of the magnetic recording layer. The magnetic recording medium of Example 3 has a c-axis lattice constant of 4.123 (Å) and Hc of 318.6 (kA/m) (4004(Oe)). Further, it has been determined that the magnetic recording medium of Example 3, for which a quick heating operation is performed, has a larger Hc and a smaller c-axis lattice constant than Example 4, in which the magnetic recording layer is not quickly heated after formation. For media with the soft magnetic lining layer 2, the Ku cannot be measured using the torque meter. Thus, there is no other option but to rely on a qualitative determination. Nevertheless, it has been confirmed that no change occurs in the microstructures of the media shown in FIG. 2. Consequently, the increase in the Hc presumably corresponds to an increase in the uniaxial anisotropy caused by magnetostriction as in Example 1. In other words, it is assumed that in Example 3, Ku increased as in Example 1. Therefore, the quick heating step of Example 3 improves thermal stability of the media.

EXAMPLE 5

A vertical recording medium is produced in the same manner as in Example 3, except that a Ti10Cr target is used as the underlayer 3 instead of Ru to form a TiCr film of 10 nm in thickness. Table 3 lists the Hc, c-axis lattice constants of the magnetic recording layer, and D50 obtained with a sample in which the magnetic recording layer, which is not quickly heated or quenched immediately after formation (Comparative Example 5), and with a sample. D50 represents a frequency (unit: inches per change in flux (FCI)) with which an output from the medium has a value equal to half the maximum value when a dependency of the output on a recording frequency is measured on a spin stand tester. A larger D50 value enables denser recording.

TABLE 5

|  | Example 5<br>Quick heating and<br>quenching executed | Comparative Example 5<br>Neither quick heating nor<br>quenching executed |
|---|---|---|
| Coercive force (kA/m) | 302.2 | 270.5 |
| c-axis lattice constant (Å) | 4.134 | 4.151 |
| D50 (kFCI) | 216 | 197 |

As in Example 3, quick heating and quenching operations improve Hc while reducing the c-axis lattice constant. Because the medium of Example 5 is also provided with the soft magnetic lining layer 2, the Ku of the medium cannot be measured using the torque magnetometer. However, it is assumed that this example improves the thermal stability of the medium similarly to Example 3. Further, Table 3 indicates that the heating and quenching operations increases D50 by about 10%, thereby enabling much denser recording. Therefore, Example 5 can improve recording characteristics as well as thermal stability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing perpendicular magnetic recording media, comprising:
    forming an underlayer on a nonmagnetic substrate;
    forming a magnetic recording layer on the underlayer;
    quenching the magnetic recording layer;
    forming a protective layer on the magnetic recording layer; and
    forming a liquid lubricant layer on the protective layer, to improve an uniaxial anisotropy Ku and a coercive force Hc of the magnetic recording layer.

2. The method of manufacturing the perpendicular magnetic recording medium according to claim 1, further comprising
    sequentially carrying out, according to a following order, the depositing of the underlayer, the forming of the magnetic recording layer, the quenching of the magnetic recording layer, the depositing of the protective layer, and the depositing of the liquid lubricant layer.

3. The method of manufacturing the perpendicular magnetic recording medium according to claim 1, further comprising:
    forming the underlayer of a metal or alloy material having a hexagonal closest-packing structure having an a-axis lattice constant greater than 100% and less than or equal to 120% of the a-axis lattice constant of the magnetic recording layer.

4. The method of manufacturing the perpendicular magnetic recording medium according to claim 1, further comprising:
    forming the underlayer of a metal or alloy material having a face-centered cubic lattice structure having an (a-axis lattice constant)×1/√2 greater than 100% and less than or equal to 120% of the a-axis lattice constant of the magnetic recording layer.

5. A method of manufacturing perpendicular magnetic recording media, comprising:
    forming an underlayer on a nonmagnetic substrate;
    forming a magnetic recording layer on the underlayer;
    quickly heating the magnetic recording layer;
    quenching the magnetic recording layer;
    forming a protective layer on the magnetic recording layer; and
    forming a liquid lubricant layer on the protective layer, to improve an uniaxial anisotropy Ku and a coercive force Hc of the magnetic recording layer.

6. The method of manufacturing the perpendicular magnetic recording medium according to claim 5, further comprising
    sequentially carrying out, according to a following order, the depositing of the underlayer, the forming of the magnetic recording layer, the quenching of the magnetic recording layer, the depositing of the protective layer, and the depositing of the liquid lubricant layer.

7. The method of manufacturing the perpendicular magnetic recording medium according to claim 5, wherein the quickly heating of the magnetic recording layer comprises increasing a temperature of magnetic recording layer by 100° C. to 400° C. at a rate of 10° C. to 35° C./min.

8. The method of manufacturing the perpendicular magnetic recording medium according to claim 5, wherein the underlayer is formed of a metal or alloy material having a hexagonal closest-packing structure having an a-axis lattice constant greater than 100% and less than or equal to 120% of the a-axis lattice constant of the magnetic recording layer.

9. The method of manufacturing the perpendicular magnetic recording medium according to claim 8, wherein said metal or alloy material comprises Ru, Ti, TiCr, Re, CoCr, CuZn, IrMo, $Ir_2W$, MoPt, or $MoRh_2$.

10. The method of manufacturing the perpendicular magnetic recording medium according to claim 8, wherein the metal or alloy material comprises Pd, Cu, Au, Ir, Pt, Rh, Ag, $Ni_3Al$, or $Co_3Ti$.

11. The method of manufacturing the perpendicular magnetic recording medium according to claim 5, further comprising:
    forming the underlayer of a metal or alloy material having a face-centered cubic lattice structure having an (a-axis lattice constant)×1/√2 greater than 100% and less than or equal to 120% of the a-axis lattice constant of the magnetic recording layer.

* * * * *